March 22, 1966     H. W. WILKINSON     3,241,397
GEAR HEAD AND A GEAR MOTOR

Filed Oct. 5, 1960     4 Sheets-Sheet 1

INVENTOR.
HARRY W. WILKINSON
BY John F. A. Earley, Jr.
ATTORNEY

March 22, 1966     H. W. WILKINSON     3,241,397
GEAR HEAD AND A GEAR MOTOR
Filed Oct. 5, 1960     4 Sheets-Sheet 2

INVENTOR.
HARRY W. WILKINSON
BY John F. A. Earley, Jr.
ATTORNEY

INVENTOR.
HARRY W. WILKINSON
BY
*John F. A. Earley, Jr.*
ATTORNEY

March 22, 1966 H. W. WILKINSON 3,241,397
GEAR HEAD AND A GEAR MOTOR
Filed Oct. 5, 1960 4 Sheets-Sheet 4

INVENTOR.
HARRY W. WILKINSON
BY
John F. A. Earley, Jr.
ATTORNEY

United States Patent Office 3,241,397
Patented Mar. 22, 1966

3,241,397
GEAR HEAD AND A GEAR MOTOR
Harry W. Wilkinson, Philadelphia, Pa., assignor, by mesne assignments, to Litton Industries, Inc., Beverly Hills, Calif., a corporation of Delaware
Filed Oct. 5, 1960, Ser. No. 60,733
7 Claims. (Cl. 74—606)

This invention relates to gear heads, and more particularly concerns gear motors and precision gear heads having gears which are accurately aligned with a minimum of backlash and exceptionally low torque, and a method of making such devices.

A gear motor is a combination of a gear head and a motor made as one unit, or connected together to form one component.

In the synchro system of a computer, for example, there may be a transmitting synchro (not shown) electrically connected to an amplifier (not shown) which is connected by electrical connectors 10 to a gear motor 11. Motor 11 is connected to and actuates a receiving synchro 55 to bring it into synchronism with the transmitting synchro.

All motors under consideration here are of the type which attain high speed (on the order of ten thousand revolutions per minute, for example) under no load, but have low torque. If the end action of the system is to be accomplished in, for example, one minute, this means that the output shaft of the gear head must revolve one revolution in one minute. Accordingly, with the input rotation at 10,000 r.p.m. and the output rotation at 1 r.p.m., the gear head accomplishes a speed reduction of ten thousand to one, with a corresponding increase of torque.

If the time allotted for revolution of the output shaft of the gear head is only one-half minute, then the speed reduction of the gear head would have to be five thousand to one, and the torque obtained on the gear head output shaft would be one-half of the torque obtained from the ten thousand to one reduction.

If the time allotted for the revolution of the output shaft of the gear head is not sufficient to provide the desired torque, then a more powerful motor must be used.

Accordingly, depending on the requirements of the system, a gear head may be designed to provide any desired torque to accomplish the function needed.

In such a system the object is to have the input (transmitter) and the output (receiver) in angular agreement, or as close thereto as possible. And it is the function of the motor, in response to the current supplied (via the amplifier) by the electrical difference between the transmitter and the receiver, to reduce the electrical and angular difference between the input and the output to as close to zero as possible with a mechanical motion.

So that the smallest possible electrical difference between transmitter and receiver can be used with minimum of electrical amplification, the motor and the gear train assembly (gear head) should be able to rotate with minimum of torque application.

It should be noted that the values of the gear reduction and backlash between the motor input and gear head output are determined by the system's requirements.

The torque required by the gear system to start and continue the rotation of only the gear head (not considering the motor armature, etc.) is determined by the inertia of the elements (gears, shafts, bearings), the friction of the bearings, and the engagement of the gears. The inertia of the gears is kept to lowest value by the physical design of the gears (of such diameter as to have low inertia values), but the reduction of friction of the bearing and gears has heretofore not been satisfactory because of the construction used for gear train assemblies.

A major problem presented is that of supporting the gear shafts in the gear head in such a manner is to prevent shaft deflection and resulting binding of gears and bearings.

If the gear shaft is supported at only one end, even though supported by two spaced ball-bearing supports, the gear shaft bends and deflects as the loaded gears tend to climb around each other, and so distort their centers and introduce backlash characteristics into the system.

Conventional gear heads have two separate bearing plates connected together and spaced apart by studs. In assembly, the individual gear shafts are located and assembled in one bearing plate, the other bearing plate is mounted over the other end of these assembled gear shafts, and the bearing plates are connected together in spaced-apart relationship by studs or screws.

Such bearing plates may be misaligned in assembly, and may become misaligned in use. Any misalignment wears one side of the gear teeth, and either causes the gears to bind, whereby a great deal of unnecessary torque is required to turn the gears, or causes the gears to spread and make backlash errors.

In gear heads constructed of separate bearing plates connected together and spaced apart by screws, if it is necessary to replace certain gear shafts and the gear head is taken apart to make such changes, the chances of putting it back together in proper alignment are very remote.

Also, in the manufacture of such individual bearing plates, it is very difficult to maintain identical center locations and other dimensions on all plates. Even though the holes are bored while a number of plates are held together in a cluster, in assembly of the motor the plate of one cluster is likely to be used with the plate of another cluster having a different center line.

Because of the high degree of accuracy required in synchro systems, the specifications for gear heads require a minimum of backlash and exceptionally low torque. The use of a gear assembly with separate bearing plates spaced apart and connected by studs or screws, and the use of gear shafts which are overhung (supported in a cantilever fashion) have created backlash and gear friction and misalignment errors.

To solve these problems, the present invention provides a gear cage which is integrally formed and carved from one piece of material.

However, the integral gear cage also presented a problem: of how to insert the gear shafts since the overall length of the shafts exceeds the distance between the inner faces of the gear-bearing bases of the cage. Logically, a long gear shaft cannot be put into a space too small for it.

The aforementioned problems have been solved by providing a gear cage which is integrally formed, and by inserting the end of the gear shaft into one side of an opening in a gear-bearing base of the cage, and supporting it there in a bearing which is inserted into the opening from the other side of the base.

Accordingly, it is an object of this invention to provide a gear head which is so constructed that the gears are precisely positioned and remain so positioned during the entire life of the gear head.

It is another object of this invention to provide a gear train which has minimum friction so that a minimum of torque moves it and the slightest voltage actuates the gear train motor to rotate the gears.

It is another object to provide a gear head wherein the gear shafts are supported on each side of the gear so as to eliminate any deflection caused by cantilever support of such gear shafts.

It is another object to prevent the misalignment of gear shafts caused by misalignment of gear-bearing plates.

It is another object of this invention to provide a gear head which may be easily taken apart and put back together in proper alignment.

It is another object of this invention to provide a gear head and a gear motor which are smaller and more compact than those previously obtainable.

It is another object to provide a gear head capable of giving very high gear reductions.

Other objects and advantages of this invention, including its simplicity and economy, and ease of manufacture on a mass production basis, will further become apparent hereinafter and in the drawings, in which.

Figure 1:
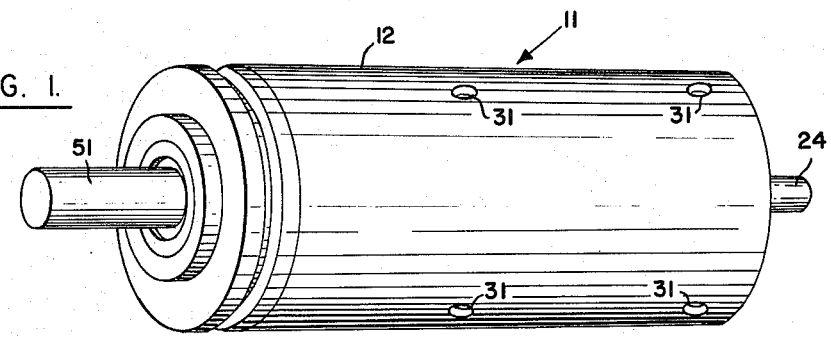
FIG. 1 is a view in perspective of a gear motor constructed in accordance with this invention.

Although specific terms are used in the following description for clarity, these terms are intended to refer only to the structure shown in the drawings and are not intended to define or limit the scope of the invention.

Turning now to the specific embodiments of the invention selected for illustration in the drawings, there is shown a gear motor 11 comprising an outer case 12, a stator 13 positioned therein (and held by a cement layer 19) between a bearing plate 14 and a bearing plate 15, a rotor 16 supported in bearings 17, 18 in plates 14, 15 (the bearings 17, 18 being held in place by snap-rings 21, 22), and a rotor shaft 23 having a tail shaft 24 at one end and a gear 25 at the other.

Also positioned in outer case 12 adjacent bearing plate 14 is an integrally formed gear cage 26.

Gear cage 26 is screwed into the threads 27 of case 12. Bearing plates 14 and 15 are properly centered and positioned in case 12 by positioning holes 28 which receive dimples 31 that are pressed into the outside of the case. Electrical leads 10 pass through an opening in end plate 15 to connect with the wiring of stator 13.

Gear cage 26 includes a gear chamber 33 which is formed by inner base 34 and intermediate base 35 connected together in spaced-apart relationship by posts 36.

Gear cage 26 also includes another gear chamber 37 which is formed between intermediate base 35 and outer base 38.

Rotor shaft 23 extends into gear cage 26 through a clearance hole 41 in base 34 and its gear 25 meshes with gear 42 on gear shaft 43. Pinion 44 on shaft 43 actuates (through intermediate gearing not shown in FIG. 2 but shown in FIG. 3) gear 45 on shaft 46, and pinion 47 on shaft 46 is positioned within gear chamber 37 to mesh with output gear 48 of output shaft 51. Gear 52 on shaft 51 meshes with gear 53 on rotor shaft 54 of receiving synchro 55.

Figure 3:
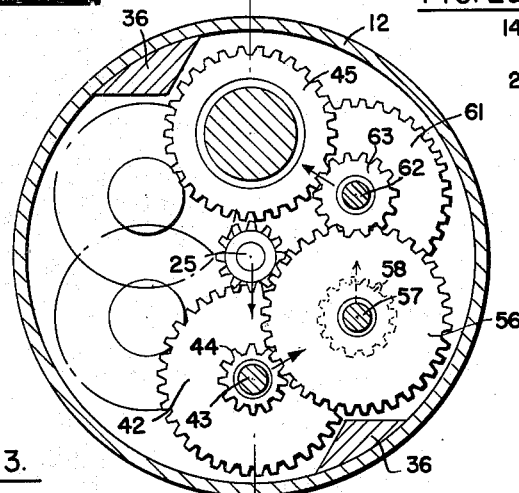
FIG. 3 is a view in vertical section taken as indicated by the lines and arrows III—III which appear in FIG. 2.

Referring to FIG. 3, which shows the full gearing between gear 25 and gear 45, gear 25 drives gear 42 on shaft 43, pinion 44 on shaft 43 drives gear 56 on shaft 57, pinion 58 on shaft 57 drives gear 61 on shaft 62, and pinion 63 on shaft 62 drives gear 45.

Referring again to FIG. 2, shaft 43 is supported in bearings 65, 66 which are seated in aligned openings 67, 68. Snap-ring 71 in snap-ring groove 72 holds bearing 65 in place, and snap-ring 73 in groove 74 holds bearing 66.

Gear shaft 46 is supported in bearings 75, 76 which are seated in aligned openings 77, 78. Bearing 75 abuts against shoulder 81 of opening 77, and bearing 76 is fixed in position by a snap-ring 82 in groove 83.

Shaft 51 is supported in bearings 84, 85 which are seated in aligned holes 86, 87. Bearing 85 abuts against shoulder 88 of hole 87, and bearing 84 is supported by a snap-ring 91 in groove 92.

Figure 7:
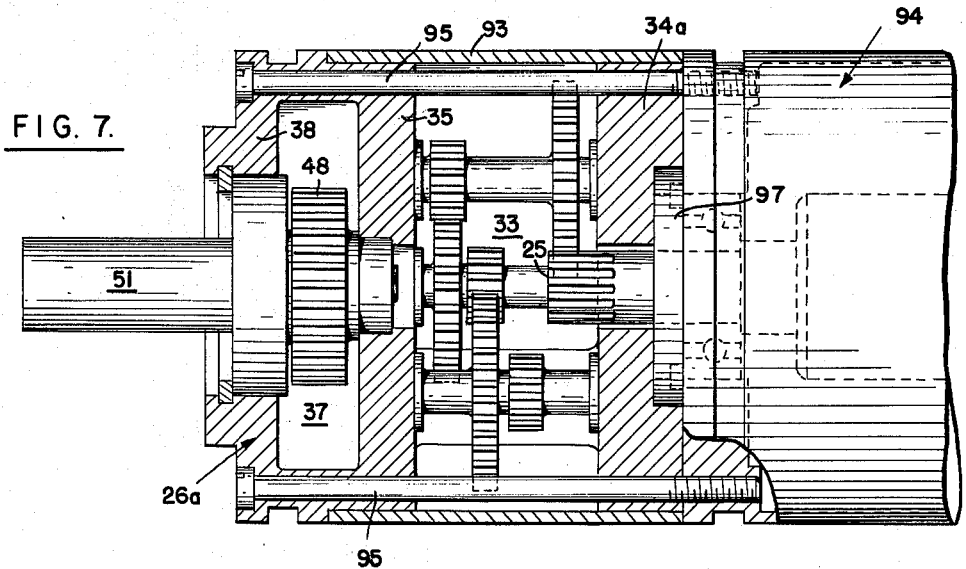
FIG. 7 is a view in horizontal cross section taken as indicated by the lines and arrows VII—VII which appear in FIG. 6.

FIGS. 4–9 show a modification of the present invention wherein outer case 12 has been replaced by a dust cover 93 which covers a gear cage 26a that is fastened to a standard motor 94 by bolts 95 (FIG. 7). Gear cage 26a is similar to gear cage 26, and has a base 34a which is provided with a recess to receive the cap 97 of motor 94.

To construct the integral gear cage 26, chamber 33 is formed by taking a steel bar, cutting into the side of the bar with a rotary motion so that the center of the cut extends past the center of the bar and is deeper than the cut at the circumference, and then cutting into the opposite side of the bar with a rotary motion for a distance such as to meet the first center cut but to stop short of the first circumference cut, thereby forming the posts 36 extending between intermediate base 35 and base 34.

Chamber 37 is gouged out of the steel bar, and all the openings for supporting the gear shafts are drilled in alignment through bases 34, 35, 38.

To assemble the gear shafts in gear cage 26a (FIG. 8), shaft 46 is swung into chamber 33 and an end thereof is inserted into opening 78. The other end of shaft 46 is moved into opening 77 so that pinion 47 is received in chamber 37 and bearing 75 abuts against the shoulder 81. Bearing 76 is inserted into opening 78 from the other side of base 34a and snap-ring 82 is seated in snap-ring groove 83 to hold the bearing in place. A recess 101 is provided in base 35 to permit the passage of the end of shaft 46 into chamber 33.

Figure 8:
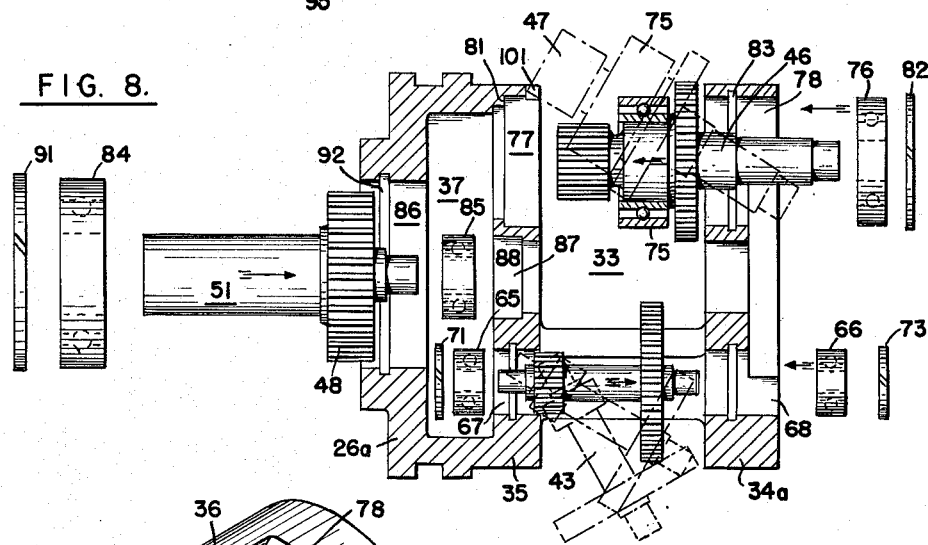
FIG. 8 is an exploded view in cross section showing how the individual gears are assembled in the gear cage.
Figure 9:
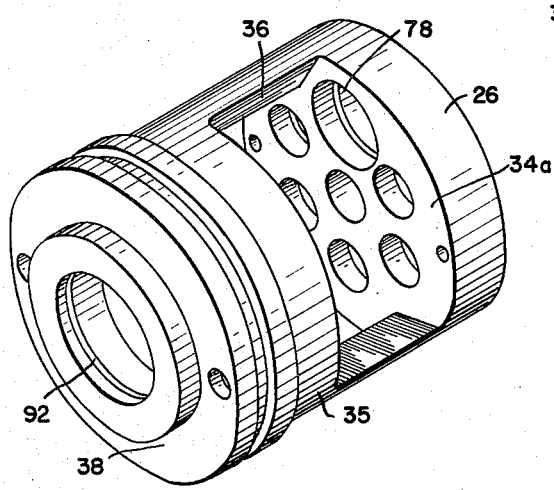
FIG. 9 is a perspective view of a one-piece integrally formed gear cage which forms an element of this invention.

Shaft 43 is swung into position in like manner as indicated by the dot-dash lines in FIG. 8. Bearing 65 and its snap-ring 71 are inserted into opening 67 from chamber 37, and bearing 66 and its snap-ring 71 are inserted into opening 68 from the motor side of base 34a.

The remaining gear shafts of the gear train are swung into position in chamber 33 in the same manner as shafts 46 and 43, and they are similarly supported therein.

Output shaft 51 is provided with a gear 48 which is smaller than the opening 86 so that gear 48 is passed easily therethrough. The small end of shaft 51 is supported by bearing 85 which is seated in opening 87 and abuts against shoulder 88. Bearing 84 is inserted into opening 86 and held in place by its snap-ring 91 in groove 92.

Figure 10:
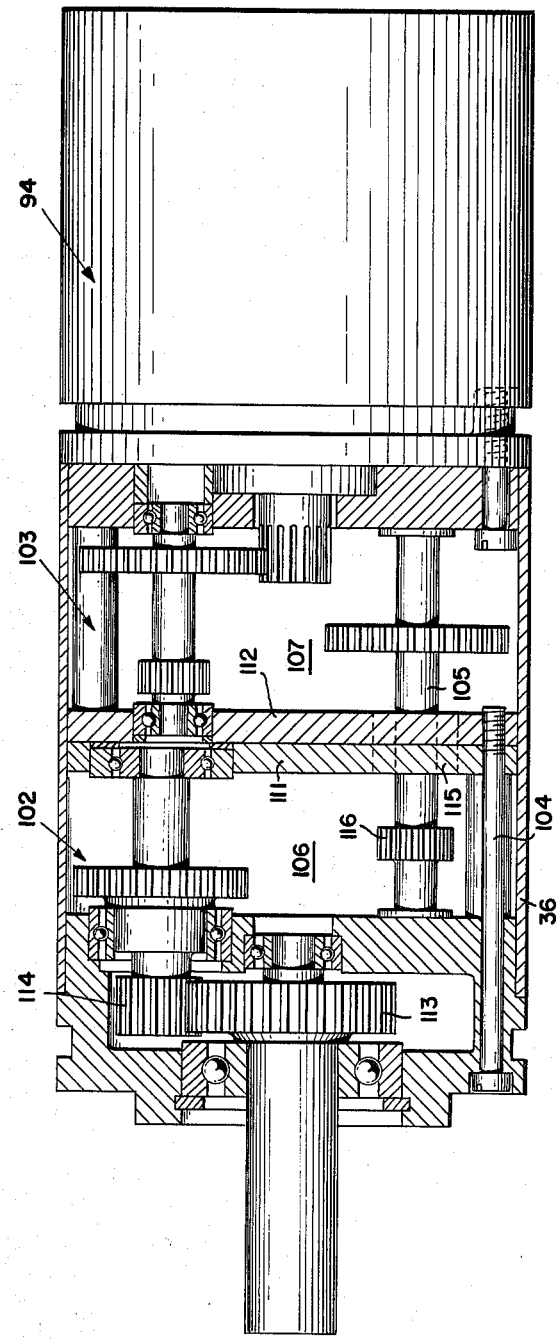
FIG. 10 is a view in section of another embodiment of the invention.

FIG. 10 illustrates an embodiment of the invention wherein a motor 94 is provided with two gear heads 102 and 103, each of which is integrally formed and similar in construction to the previously described gear heads. Gear head 102 is connected to gear head 103 by bolts 104.

Cross shaft 105 extends between chambers 106 and 107. Although gear heads 102 and 103 are connected together with bolts so that there is some chance of misalignment between bases 111 and 112, any such misalignment would affect only the cross shaft 105. All the other gear shafts remain in alignment as they should be, and there is no chance of misalignment of the two important gears, output gear 113 and its drive pinion 114. If desired, bases 111 and 112 may be joined together in integral fashion.

It is to be noted that clearance hole 115 is larger than pinion 116 of cross shaft 105 so that pinion 116 is easily passed therethrough.

Figure 2:
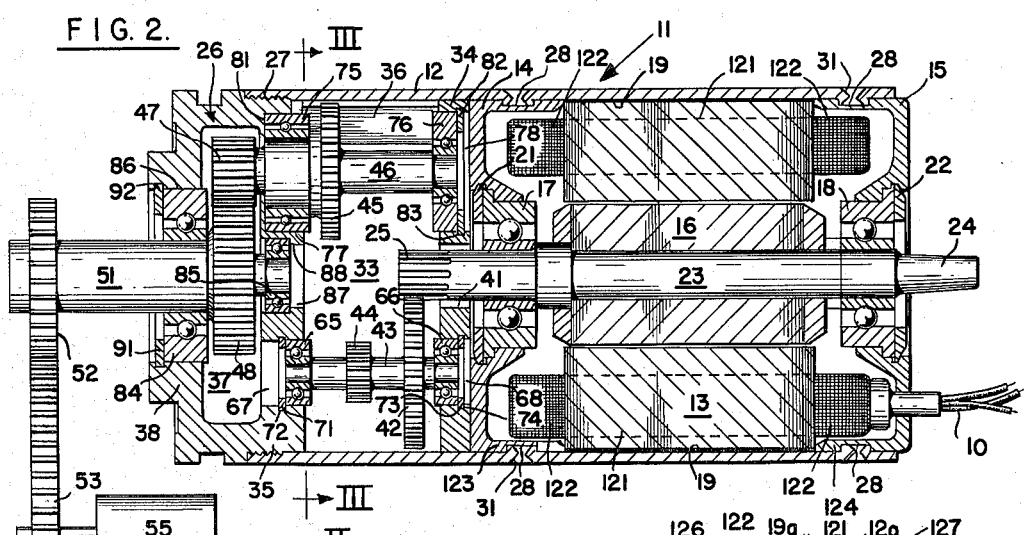
FIG. 2 is a view in section taken as indicated by the lines and arrows II—II which appear in FIG. 3.

Referring to FIG. 2, gear motor 11 includes outer case 12, stator 13 having a stack of laminations 121 and windings 122, identical and interchangeable bearing plates 14–15 having peripheral flanges 123, 124 adjacent the inner surface of case 12 and bearing against the ends of lamination stack 121, cement layer 19 connecting stator 13 to case 12, and rotor 16 supported in the bearing plates 14–15. Bearing plates 14–15 have positioning holes 28 formed in peripheral flanges 123, 124, and case 12 has dimples 31 formed therein in registry with positioning holes 28 to join case 12 to the bearing plates 14–15, whereby to properly position the elements of the motor 11 relative to each other.

Dimples 31 may initially be half formed so as to snap into holes 28 and thereby properly position the elements, whereupon dimples 31 are further depressed to rigidly connect case 12 to bearing plates 14–15. If desired, holes 28 may be replaced by grooves that encircle the flanges 123, 124. Such grooves receive dimples 31 to position the motor elements axially.

Figure 2A:
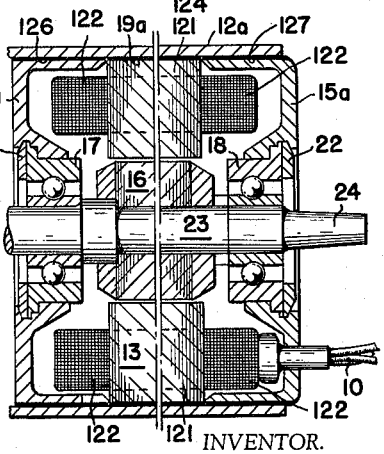
FIG. 2a is a fragmentary view in section of another embodiment of the invention.
Figure 4:
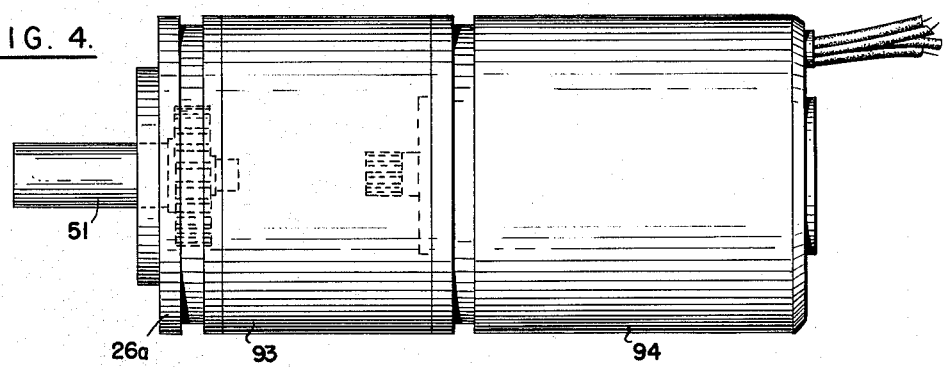
FIG. 4 is a view in side elevation of another embodiment of the invention.
Figure 5:
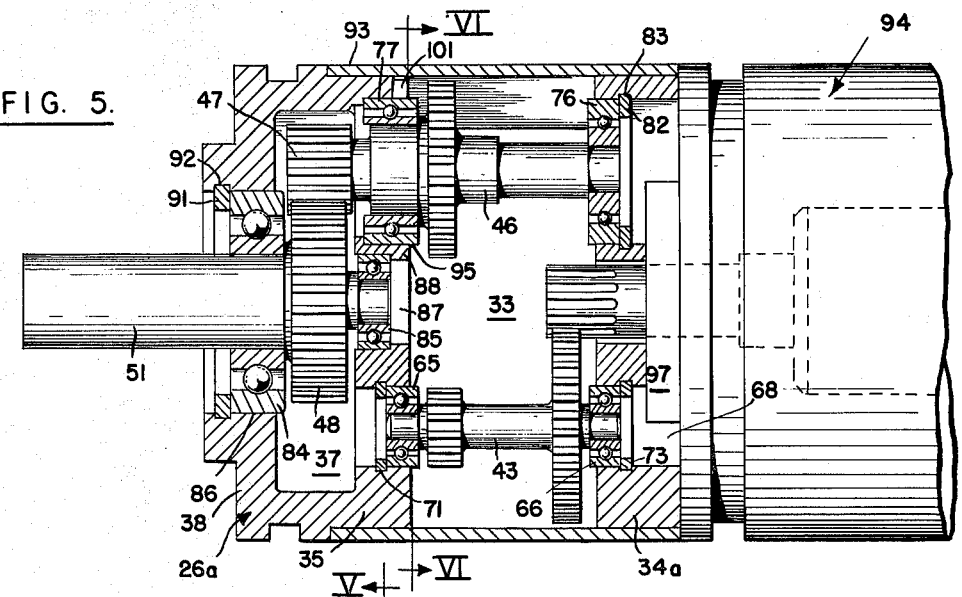
FIG. 5 is a view in section of the embodiment of FIG. 4 taken as indicated by the lines and arrows V—V which appear in FIG. 6.
Figure 6:
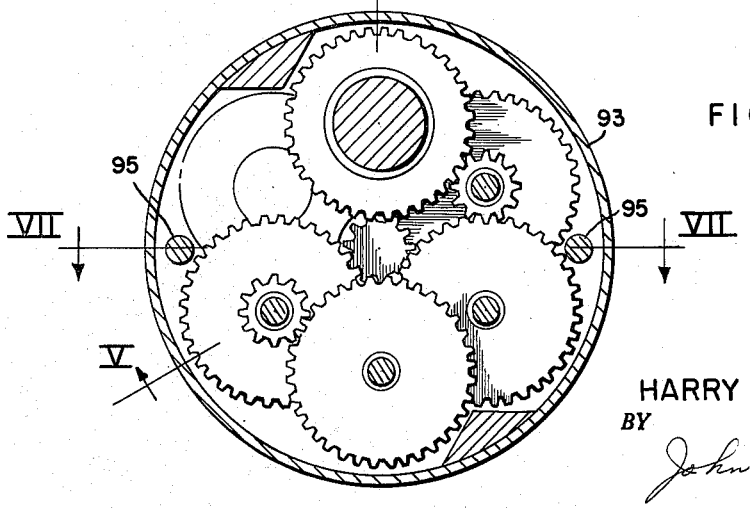
FIG. 6 is a view in vertical section taken as indicated by the lines and arrows VI—VI which appear in FIG. 5.

Referring to FIG. 2a, the bearing plates 14a, 15a may be cemented to case 12a in a manner similar to that in which stator 13 is cemented to case 12 by cement layer 19 (FIG. 2), with no dimples 31 or holes 28 being used. The procedure in assembling the embodiment of FIG. 2a is to: locate and cement plate 14a in case 12a with a cement layer 126, locate and cement stator 13 to case 12a with a cement layer 19a, and locate and cement plate 15a to case 12a with a cement layer 127. The three pieces may then be pressed together during the time that the cement is being cured.

This assembly is then through-bored to assure that the bearing plates 14a, 15a, and stator 13 have identical bore diameters and are concentric. This procedure insures that the later inserted rotor 16 and bearings 17 and 18 are mounted concentrically. Bearing plates 14a and 15a, and stator 13 have been drilled prior to this through-bore operation, so that the through-bore operation removes only a slight amount of material, just enough to obtain the identical bore on the same center for the three elements 13, 14a, and 15a.

The gear motor of FIG. 2 is very small by comparison to previous devices having similar characteristics. It is more compact, its elements have been brought closer together, and it is lighter. All of this is, of course, of advantage in miniaturization.

In conventional gear heads using a gear assembly comprising separate end plates joined by bolts, the chances of taking the gear head apart and putting it back together properly are very remote. In the present invention, the gear shafts may be removed and replaced in the integral gear cage without any danger of misaligning the gears.

It is to be understood that the form of the invention herewith shown and described is to be taken as a preferred embodiment. Various changes may be made in the shape, size and arrangement of parts. For example, equivalent elements may be substituted for those illustrated and described, parts may be reversed, and certain features of the invention may be utilized independently of the use of other features, all without departing from the spirit or scope of the invention as defined in the subjoined claims.

The claimed invention:

1. A gear head comprising an integrally formed gear cage having at least a pair of bases spaced apart and connected together by integral posts to form a gear chamber therebetween, one of said bases having an opening formed therethrough, a bearing seated in said opening, means holding said bearing in place, a gear shaft extending between said bases and having one end supported by said bearing, means supporting the other end of said gear shaft in the other base, and a gear mounted on said shaft, said shaft being longer than the distance between said bases, the space between said bases being open except for said posts and being large enough to allow for insertion and removal of said gear and gear shaft through the space between said bases without removing the gear from the shaft and without disturbing the integrality of the cage.

2. A gear head comprising an integrally formed gear cage having at least a pair of bases spaced apart and connected together by integral posts to form a gear chamber therebetween, one of said bases having an opening formed therethrough with a snap-ring groove formed therein, a bearing seated in said opening, a snap-ring seated in said groove and holding said bearing in place, a gear shaft extending between said bases and having one end supported by said bearing, means supporting the other end of said gear shaft in the other base, and a gear mounted on said shaft, said shaft being longer than the distance between said bases, the space between said bases being open except for said posts and being large enough to allow for insertion and removal of said gear and gear shaft through the space between said bases without removing the gear from the shaft and without disturbing the integrality of the cage.

3. A gear head comprising an integrally formed gear cage having at least a pair of bases spaced apart and connected together by integral posts to form a gear chamber therebetween, each of said bases having an opening therethrough with said openings being in alignment, a bearing seated in each opening, a gear shaft supported in and extending between said bearings, said gear shaft being longer than the distance between the inner faces of said bases, means holding said bearings in place, and a gear integrally mounted on said shaft and being larger in circumference than the circumferences of said base openings, the space between said bases being open except for said posts and being large enough to allow for insertion and removal of said gear and gear shaft through the space between said bases without removing the gear from the shaft and without disturbing the integrality of the cage.

4. In a gear head, an integrally formed gear cage comprising at least a pair of spaced-apart bases, posts formed integrally with said bases and connected therebetween to form a gear chamber therebetween, and one of said bases having an opening therein which is in alignment with an opening in the other of said bases, the space between said bases being open except for said posts and being large enough to allow for insertion and removal of a gear and gear shaft through the space between said bases without removing the gear from the gear shaft and without disturbing the integrality of the cage.

5. In a gear head, an integrally formed gear cage comprising three spaced-apart base members forming two chambers, and integral means joining said base members together, said base members having at least a pair of aligned holes formed therein, said gear chambers being large enough to allow for insertion and removal of a gear mounted on a gear shaft without removal of the gear from the shaft and without disturbing the integrality of said cage.

6. In a gear head, an integrally formed gear cage comprising three-spaced-apart base members forming two chambers, integral posts joining said base members together, said base members having at least a pair of aligned holes formed therein, a gear shaft supported in said openings and extending from one of said chambers to the other, and a gear mounted on said shaft, said shaft being longer than the distance between said bases, the space between said bases being open except for said posts and being large enough to allow for insertion and removal of said gear and gear shaft through the space between said bases without removing the gear from the shaft and without disturbing the integrality of the cage.

7. In a gear head, an integrally formed gear cage comprising at least a pair of bases spaced apart from each other, integral means connecting said bases together to form a gear chamber therebetween, said bases having at least a pair of aligned openings formed therethrough, a gear shaft supported in said openings and extending completely through one of said openings, and a gear mounted on said shaft, said shaft being longer than the distance between said bases, the space between said bases being open except for said posts and being large enough to allow for insertion and removal of said gear and gear shaft through the space between said bases without removing the gear from the shaft and without disturbing the integrality of the cage.

References Cited by the Examiner

UNITED STATES PATENTS

| | | | |
|---|---|---|---|
| 1,202,782 | 10/1916 | Blauvelt | 74—801 |
| 1,327,681 | 1/1920 | Leipert | 74—606 |
| 1,614,031 | 1/1927 | Holmes | 310—83 |
| 1,674,200 | 6/1928 | Gatten | 74—606 |
| 1,677,178 | 7/1928 | Fay | 29—428 |
| 1,820,061 | 8/1931 | Flagg | 74—801 |
| 2,465,042 | 11/1949 | Schlenker et al. | 310—83 |
| 2,489,833 | 11/1949 | Tamborello | 74—606 |
| 2,762,232 | 9/1956 | Bade | 74—606 |
| 2,819,417 | 1/1958 | Glass | 310—58 |
| 2,822,487 | 2/1958 | Barel | 310—58 |
| 2,950,635 | 8/1960 | Bieger et al. | 74—606 |
| 2,952,165 | 9/1960 | Bade | 74—606 |
| 2,974,407 | 3/1961 | Barr | 29—428 |
| 2,989,995 | 6/1961 | Happe | 74—421.5 |
| 3,009,366 | 11/1961 | Roberts | 74—606 |
| 3,073,176 | 1/1963 | Daugirdas | 310—83 |

MILTON O. HIRSHFIELD, *Primary Examiner.*

ORIS L. RADER, *Examiner.*